(12) United States Patent
Lambricht

(10) Patent No.: US 10,457,585 B2
(45) Date of Patent: Oct. 29, 2019

(54) CHEMICALLY TEMPERABLE GLASS SHEET

(71) Applicant: AGC GLASS EUROPE, Louvain-la-Neuve (BE)

(72) Inventor: Thomas Lambricht, Perwez (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 15/567,479

(22) PCT Filed: Apr. 13, 2016

(86) PCT No.: PCT/EP2016/058090
§ 371 (c)(1),
(2) Date: Oct. 18, 2017

(87) PCT Pub. No.: WO2016/169823
PCT Pub. Date: Oct. 27, 2016

(65) Prior Publication Data
US 2018/0111872 A1    Apr. 26, 2018

(30) Foreign Application Priority Data
Apr. 21, 2015  (EP) .................................. 15164371

(51) Int. Cl.
*C03C 3/087*  (2006.01)
*C03C 21/00*  (2006.01)
*C03C 3/085*  (2006.01)
*C03C 4/18*   (2006.01)

(52) U.S. Cl.
CPC .............. *C03C 3/087* (2013.01); *C03C 3/085* (2013.01); *C03C 4/18* (2013.01); *C03C 21/002* (2013.01); *C03C 2204/00* (2013.01)

(58) Field of Classification Search
CPC ........ C03C 3/087; C03C 21/00; C03C 21/002
See application file for complete search history.

(56) References Cited

U.S. PATENT DOCUMENTS

| | | |
|---|---|---|
| 2013/0224491 A1 | 8/2013 | Smedskjaer et al. |
| 2016/0214885 A1* | 7/2016 | Senshu ................. C03C 21/002 |
| 2017/0001903 A1* | 1/2017 | Miyasaka ............. C03C 21/002 |
| 2017/0121220 A1* | 5/2017 | Miyasaka ............... C03C 3/087 |
| 2017/0174551 A1* | 6/2017 | Lambricht .............. C03C 3/085 |

FOREIGN PATENT DOCUMENTS

| | | | |
|---|---|---|---|
| GB | 1 334 828 A | 10/1973 | |
| WO | WO 2014/148020 A1 | 9/2014 | |
| WO | WO 2015/150207 A1 | 10/2015 | |
| WO | WO-2015147092 A1 * | 10/2015 | ........... C03C 21/002 |
| WO | WO-2015199150 A1 * | 12/2015 | ............. C03C 3/087 |

OTHER PUBLICATIONS

International Search Report dated Jun. 24, 2016, in PCT/EP2016/058090 filed Apr. 13, 2016.

* cited by examiner

*Primary Examiner* — Elizabeth A. Bolden
(74) *Attorney, Agent, or Firm* — Oblon, McClelland, Maier & Neustadt LLP

(57) ABSTRACT

The invention relates to a glass sheet having a boron- and lithium-free glass composition comprising the following in weight percentage, expressed with respect to the total weight of glass: $65 \leq SiO_2 \leq 78\%$ $5 \leq Na_2O \leq 20\%$ $0 \leq K_2O \leq 5\%$ $3 < Al_2O_3 \leq 5\%$ $0 < CaO < 4.5\%$ $5 \leq MgO \leq 12\%$; and comprising the following: $0.88 \leq [MgO/(MgO+CaO)] < 1$. The invention corresponds to an easy chemically-temperable soda-silica type glass composition, which is more suited for mass production than aluminosilicate glass, and therefore is available at low cost, and with a base glass/matrix composition that is close to or very similar to compositions already used in existing mass production.

20 Claims, No Drawings

CHEMICALLY TEMPERABLE GLASS SHEET

1. FIELD OF THE INVENTION

The present invention relates to a glass sheet which is able to be chemically tempered/strengthened. In particular, the present invention relates to a glass sheet which is able to be easily chemically tempered/strengthened and which is inexpensive and easy to produce.

Chemically strengthened glass sheets are finding increasing applications in specialized glazing jobs where a mechanical resistance is required/mandatory, in a monolithic or laminated form, like transportation (i.e. aeronautical, automotive), building/architecture and display industries. Amongst such applications, the display industry has become in the several past years a huge market on demand for chemically strengthened transparent glass sheets as protective/cover glass, viewing window or (touch)screen for numerous electronic devices like mobile phones, smartphones, TV, computers, digital cameras, etc. Indeed, as many of these devices are portable, the glass used is mechanically solicited a lot and it is therefore highly desirable that it is able to tolerate impact and/or damage, such as scratches or impact, during use and transport. Chemical strengthening is even more of great importance in the domain of displays because such a domain requires glass sheets of low thickness (as low as less than 1 mm) and because chemical strengthening is known as the process of choice to mechanically reinforce (ultra-)thin glass sheets. For weight reasons, it is also advantageous to use thin glass sheets as cover glass for solar, thermal or photovoltaic devices.

2. SOLUTIONS OF THE PRIOR ART

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. The rupture strength of a glass article which has been so treated is thus increased by a value approximately equal to the surface compressive stress generated.

Nevertheless, a damage capable of affecting the surface of a chemically strengthened glass during its use leads to a decrease in this strengthening effect and can even annihilate it if the damage is such that the layer under compression is penetrated. In consequence, depending on the use intended for the chemically strengthened glass, focus is made on achieving a high value of surface compressive stress (or "CS") and/or a high value of thickness of the layer under compression (which is associated with the parameter called the "depth of layer" or "DoL", namely the depth reached by the ions introduced) which ideally at least equal to the depth of the largest possible defect/damage that the glass may undergo. The combination of these two parameters are generally considered to define appropriately the quality of the resulting mechanical strength.

In particular, in the display domain, when using a "piece-by-piece process" to produce chemically strengthened glass sheets (cutting to final size is carried out before tempering treatment), a high value of DoL (preferably higher than 10 microns and very preferably higher than 12 microns or even better higher than 15 microns) is searched for edge strength, while when using a "sheet process" (cutting to final size is carried out after tempering treatment), "central tension" (defined as $(CS*DoL)/(glass\ thickness - 2*DoL)$) must be kept low.

It is also known that the two strengthening parameters also depend significantly, for a given glass composition, on the conditions of temperature and time of the ion exchange process. Thus, the thickness of the layer under compression increases with the temperature and with the duration of the ion-exchange according to the known diffusion laws. But the higher the temperature, the more rapidly the stresses induced by the ion exchange relax. Likewise, extending the treatment for a too long period allows giving the stresses the necessary time to relax and thus results in a less degree of toughening. The conditions to be chosen for the process therefore reside generally in a compromise between the optimum temperature and the minimum duration, to optimize process cost.

To lower the cost of the chemical strengthening (limiting duration and/or temperature to reach searched values of compressive stress and DOL), a lot of glass compositions which are "easy chemically temperable" (meaning that they especially favour ion exchange) have been proposed (merely described or already on the market) but they generally have various drawbacks.

Many of them comprise ingredients originating from expensive raw materials and/or considerably modifying the physical properties of the glass (molten or final). Some of the chemically temperable glass compositions known contain, for example, significant contents of lithium and/or boron. However, lithium has the disadvantage of increasing the density of the glass while boron has the disadvantage to cause sometimes formation of ream by its evaporation and furnace wall/refractories corrosion. Moreover, both have the additional and significant drawback to greatly increase final glass price, due to high price of their corresponding raw materials.

Aluminosilicate-type glass compositions, such as for example those described in US Patent Application US2012/0196110 A1, the GORILLA® glass product from Corning or the DragonTrail® glass product from Asahi Glass Co., are also known to be very efficient for chemical tempering. However, they have a lot of drawbacks. Their high temperature properties make them very difficult to produce (viscosity, fining ability, forming, refractories corrosion). Their cost is relatively high due to expensiveness of some raw materials to use (i.e. alumina) and due to the high temperatures required for their production (high content of energy/fuel).

Contrary to aluminosilicate glass compositions, soda-lime-silica glass compositions are generally not considered as good candidates for easy chemically temperable compositions, even if they are by far less expensive.

Finally, it is known that it is quite difficult to modify, even slightly, a glass composition, because:

a glass production line, and in particular a float line, represents considerable investment and it is not repairable if the composition causes, for example, damages to the refractories; and the transition time while changing from a composition to another is one parameter which is of high importance when producing glass, because if long, the production cost of the final glass is drastically negatively impacted.

Accordingly, there is a demand of the market in the display domain in particular for an enable chemically-temperable soda-lime-silica-type glass composition, which is more suited for mass production than aluminosilicate glass, and therefore is available at low cost, and with a base glass/matrix composition that is close to or very similar to compositions already used in existing mass production.

3. OBJECTIVES OF THE INVENTION

The objective of the invention in particular is to remedy the cited disadvantages and resolving the technical problem, i.e. to provide a glass composition which is easy chemically temperable or, in other words, more favourable to ion exchange than conventional soda-lime-silica glass compositions.

Another objective of the invention in at least one of its embodiments is to provide a glass composition which is easy chemically temperable and which allows reaching strengthening parameters appropriate for a "piece-by-piece" process used to produce cover glass for display devices (edge strength obtained typically by DoL<10-15 microns). In particular, an objective of the invention in such a context is to provide a glass composition which is easy chemically temperable and which allows obtaining great exchange depth, while keeping compressive stress values that result in a better reinforcement of glass.

Another objective of the invention in at least one of its embodiments is to provide a glass composition which is easy chemically temperable and easy to produce, in particular on an existing line of production of classical soda-lime-silica glass. In particular, an objective of the invention in such a context is to provide a glass composition which is easy chemically temperable and which does not require long transition time when passing from the production of the classical soda-lime-silica composition to the temperable composition (and vice-versa). Still in such a context, an objective of the invention in such a context is to provide a glass composition which is easy chemically temperable and which does not require to use raw materials, techniques and/or industrial installations which are different from those employed for classical soda-lime-silica glass ordinary produced (or, in other words, compatible with classical float process). More particularly, an objective of the invention in at least one of its embodiments is to provide a glass composition which is easy chemically temperable and with targeted properties (lower viscosity, lower working point temperature, melting point<1550–1500° C., sulfates fining ability, low refractories corrosion, appropriate devitrification temperature), thereby avoiding known drawbacks of alumino-silicate composition and making composition compatible with existing tools for production of soda-lime glass.

Finally, another objective of the invention is to provide a solution to the disadvantages to the prior art that is simple, quick and, above all, economical.

4. OUTLINE OF THE INVENTION

The invention relates to a glass sheet having a boron- and lithium-free glass composition comprising the following in weight percentage, expressed with respect to the total weight of glass:

$65 \leq SiO_2 \leq 78\%$ $5 \leq Na_2O \leq 20\%$ $0 \leq K_2O < 5\%$ $3 < Al_2O_3 \leq 5\%$ $0 < CaO < 4.5\%$ $4 \leq MgO \leq 12\%$;

and comprising the following: $0.88 \leq [MgO/(MgO+CaO)] < 1$.

Hence, the invention rests on a novel and inventive approach, since it enables a solution to be found for the disadvantages of prior art, in particular the disadvantages of aluminosilicate glasses while keeping, at least partially, their advantages.

The inventors have indeed found that it is possible to obtain an easy chemically temperable glass sheet which is unexpensive and easy to mass produce by combining in a soda-silica glass matrix, a low alumina and CaO content and a specific $[MgO/(MgO+CaO)]$ between 0.88 and 1.

Throughout the present text, when a range is indicated, the extremities are included. In addition, all the integral and subdomain values in the numerical range are expressly included as if explicitly written. Also throughout the present text, the values of content as percentages are values by weight (also mentionned as wt %), expressed with respect to the total weight of the glass.

Other features and advantages of the invention will be made clearer from reading the following description of preferred embodiments given by way of simple illustrative and non-restrictive examples.

The glass sheet of the invention is made of a soda-silica glass composition/matrix, comprising $SiO_2$ and $Na_2O$ as the main components and further comprising MgO, $Al_2O_3$, etc and optionally CaO, $K_2O$ etc.

The glass sheet of the invention is able to be chemically tempered or, in other words, ion-exchangeable/able to undergo an ion-exchange.

The glass sheet of the invention may be a glass sheet obtained by the float process, a drawing process, a rolling process or any other process known to manufacture a glass sheet starting from a molten glass composition. According to a preferred embodiment, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns. In many cases and as illustration, this content lies between 1 and 5 wt %, integrated over the first 10 microns starting from the surface.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention may have a thickness of from 0.1 to 25 mm. Advantageously, in the case of display applications, the glass sheet according to the invention has preferably a thickness of from 0.1 to 6 mm. More preferably, in the case of display applications and for reasons of weight, the thickness of the glass sheet according to the invention is of from 0.1 to 2.2 mm.

According to the invention, the composition of the glass sheet is boron-free. This meant that boron is not intentionally added in the glass batch/raw materials and that, if it is present, $B_2O_3$ content in the composition of the glass sheet reaches only level of an impurity unavoidably included in the production. For example, $B_2O_3$ content in the composition of the glass sheet of the invention is less than 0.01 or even better less than 0.005 wt %.

According to the invention, the composition of the glass sheet is lithium-free. This meant that lithium is not intentionally added in the glass batch/raw materials and that, if it is present, $Li_2O$ content in the composition of the glass sheet reaches only level of an impurity unavoidably included in the production. For example, $Li_2O$ content in the composition of the glass sheet of the invention is less than 0.01 wt % or even better less than 0.005 wt %.

According to the invention, the composition of the glass sheet comprises: $3<Al_2O_3\leq5$ wt %. Preferably, the composition of the glass sheet comprises: $3<Al_2O_3<5$ wt %. Preferably also, the composition of the glass sheet comprises: $4\leq Al_2O_3\leq5$ wt %, or even $4\leq Al_2O_3<5$ wt %. Aternatively, the composition of the glass sheet comprises: $4\leq Al_2O_3\leq4.5$ wt %. Alternatively, the composition of the glass sheet comprises: $4.5\leq Al_2O_3\leq5$ wt % or even $4.5\leq Al_2O_3<5$ wt %.

According to the invention, the composition of the glass sheet comprises: $0<CaO<4.5$ wt %. Preferably, the composition of the glass sheet comprises: $0<CaO<4$ wt % and more preferably, $0<CaO<3.5$ wt %. In a particularly preferred embodiment, the composition of the glass sheet comprises: $0<CaO<3$ wt % or even, $0<CaO<2$ wt %. In tha very preferred embodiment, the composition of the glass sheet comprises: $0<CaO<1.63$ wt %. In the most preferred embodiment, the composition of the glass sheet comprises: $0<CaO\leq1.5$ wt % or even, $0<CaO\leq1$ wt %.

According to the invention, the composition of the glass sheet comprises: $4\leq MgO\leq12$ wt %. Preferably, the composition of the glass sheet comprises: $5.5\leq MgO\leq10$ wt % and more preferably, $6\leq MgO\leq10$ wt %.

According to the invention, the composition of the glass sheet comprises: $0\leq K_2O<5$ wt %. Preferably, the composition of the glass sheet comprises: $0\leq K_2O\leq4$ wt % and more preferably, $0\leq K_2O\leq3$ wt %, even better $0\leq K_2O\leq2$ wt % or even more better $0\leq K_2O\leq1$ wt %.

According to the invention, the composition of the glass sheet comprises the following: $0.88\leq[MgO/(MgO+CaO)]<1$. Preferably, the composition of the glass sheet comprises the following: $0.9\leq[MgO/(MgO+CaO)]<1$. Alternatively, the composition of the glass sheet comprises the following: $0.88\leq[MgO/(MgO+CaO)]\leq0.98$. More preferably, the composition of the glass sheet comprises the following: $0.90\leq[MgO/(MgO+CaO)]\leq0.98$ or even better, $0.92\leq[MgO/(MgO+CaO)]\leq0.98$, or even more better $0.92\leq[MgO/(MgO+CaO)]\leq0.95$.

According to a first embodiment of the invention, the composition comprises total iron (expressed in the form of $Fe_2O_3$) in a content ranging from 0.002 to 1.7% by weight. Preferably, the composition of the invention comprises a total iron (expressed in terms of $Fe_2O_3$) content ranging from 0.002 to 0.6 wt % and, more preferably, ranging from 0.002 to 0.2 wt %.

In a very preferred embodiment, the composition of the invention comprises a total iron (expressed in form of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $F_{e2}O_3$) content ranging from 0.002 to 0.015 wt %.

According to a particularly preferred embodiment, the composition of the glass sheet of the invention comprises the following in weight percentage, expressed with respect to the total weight of glass:

$65\leq SiO_2\leq78\%$ $5\leq Na_2O\leq20\%$ $0\leq K_2O\leq3\%$ $3<Al_2O_3\leq5\%$ $0<CaO<3\%$ $4\leq MgO\leq12\%$;

and comprising the following: $0.88\leq[MgO/(MgO+CaO)]<1$.

According to this last embodiment, the composition of the glass sheet of the invention more preferably comprises the following in weight percentage, expressed with respect to the total weight of glass:

$65\leq SiO_2\leq78\%$ $5\leq Na_2O\leq20\%$ $0\leq K_2O\leq2\%$ $4\leq Al_2O_3\leq5\%$ $0<CaO<2\%$ $6\leq MgO\leq10\%$;

and comprising the following: $0.88\leq[MgO/(MgO+CaO)]<1$.

According to another embodiment, the composition of the glass sheet comprises ZnO in an content lower than 0.1 wt % Preferably, the composition of the glass sheet is free of ZnO. This meant that the element zinc is not intentionally added in the glass batch/raw materials and that, if it is present, ZnO content in the composition of the glass sheet reaches only level of an impurity unavoidably included in the production.

According to another embodiment, the composition of the glass sheet comprises $ZrO_2$ in an content lower than 0.1 wt %. Preferably, the composition of the glass sheet is free of $ZrO_2$. This meant that the element zirconium is not intentionally added in the glass batch/raw materials and that, if it is present, $ZrO_2$ content in the composition of the glass sheet reaches only level of an impurity unavoidably included in the production.

According to still another embodiment, the composition of the glass sheet comprises BaO in an content lower than 0.1 wt %. Preferably, the composition of the glass sheet is free of BaO. This meant that the element zinc is not intentionally added in the glass batch/raw materials and that, if it is present, BaO content in the composition of the glass sheet reaches only level of an impurity unavoidably included in the production.

According to still another embodiment, the composition of the glass sheet comprises SrO in an content lower than 0.1 wt %. Preferably, the composition of the glass sheet is free of SrO. This meant that the element strontium is not intentionally added in the glass batch/raw materials and that, if it is present, SrO content in the composition of the glass sheet reaches only level of an impurity unavoidably included in the production.

According to still another embodiment, the composition of the glass sheet comprises bulk $SnO_2$ in an content lower than 0.1 wt % (bulk content excluding $SnO_2$ in the "tin face" of a float glass sheet). Preferably, the composition of the glass sheet is free of bulk $SnO_2$. This meant that the element tin is not intentionally added in the glass batch/raw materials and that, if it is present, bulk $SnO_2$ content in the composition of the glass sheet reaches only level of an impurity unavoidably included in the production.

According to a preferred embodiment of the invention, the composition comprises coloring components other than iron, chromium and cobalt oxides in a total content which less than 0.005 wt %. Such an embodiment allows to control color and thus to provide a glass sheet which is neutral as mainly requested for display applications. More preferably, the composition of the invention comprises coloring components other than iron, chromium and cobalt oxides in a total content which is less than 0.003 wt %.

Advantageously, the composition of the invention may further comprise chromium and/or cobalt oxides. According to a preferred embodiment, when the composition of the invention comprises a total iron (expressed in terms of $Fe_2O_3$) content ranging from 0.002 to 0.06 wt %, the composition may further chromium and/or cobalt oxides in a total content which is between 0.001 and 0.025 wt %. This meant that the composition may comprise only chromium, only cobalt or both. Such a specific composition makes the glass especially suitable for touch technology based on IR transmission.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to the applications and/or properties desired, other layer(s)/treatment(s) can be deposited/done on one and/or the other face of the glass sheet according to the invention.

The invention also relates to a glass sheet according to the invention which is chemically tempered. All previously described embodiments and preferred composition ranges also apply to the invention of chemically tempered glass sheet.

Finally, the invention also relates to the use of the chemically tempered glass sheet according to the invention in an electronic device.

Embodiments of the invention will now be further described, by way of examples only, together with some comparative examples, not in accordance with the invention. The following examples are provided for illustrative purposes, and are not intended to limit the scope of this invention.

EXAMPLES

Powder raw materials were mixed together and placed in melting crucibles, according the compositions specified in the following table. The raw material mix was then heated up in an electrical furnace to a temperature allowing complete melting of the raw material.

| Wt % | Comparative ex. 1 (SL) | Comparative ex. 2 (AS) | Comparative ex. 3 (AS) | Ex 1 | Ex2 | Ex3 |
| --- | --- | --- | --- | --- | --- | --- |
| $SiO_2$ | 72 | 60.9 | 68 | 69.8 | 68.6 | 68.9 |
| $Al_2O_3$ | 1.3 | 12.8 | 4.4 | 4.1 | 4.8 | 4.5 |
| CaO | 7.9 | 0.1 | 3.7 | 0.6 | 1.0 | 1.0 |
| MgO | 4.5 | 6.7 | 7.7 | 8.8 | 8.6 | 8.6 |
| $Na_2O$ | 13.9 | 12.2 | 14.9 | 16.3 | 16.7 | 15.7 |
| $K_2O$ | 0 | 5.9 | 1.0 | 0.0 | 0.0 | 1.0 |
| $Fe_2O_3$ | 0.01 | 0.02 | 0 | 0.01 | 0.01 | 0.01 |
| BaO | 0 | 0.2 | 0 | 0 | 0 | 0 |
| $SO_3$ | 0.36 | 0 | 0.36 | 0.36 | 0.36 | 0.36 |
| SrO | 0 | 0.2 | 0 | 0 | 0 | 0 |
| $ZrO_2$ | 0 | 1.0 | 0 | 0 | 0 | 0 |

After the melting and the homogenization of the composition, the glass was cast in several small samples of 40*40 mm and annealed in an annealing furnace. Subsequently, the samples were polished up to a surface state similar to floated glass (mirror polishing). Several samples were produced for each composition. Composition of comparative example 1 corresponds to a classical soda-lime (SL) glass according to the state of the art, composition of comparative example 2 corresponds to a commercially available alumino-silicate (AS) glass, and composition of comparative example 3 corresponds to another alumino-silicate glass according to the state of the art. Compositions of example 1-3 correspond to compositions according to the invention, combining low alumina and low calcium oxide content, and a ratio MgO/(MgO+CaO) higher than 0.88 and lower than 1.

Chemical Tempering

The samples prepared in above section were chemically tempered at the same time and in the same conditions. The samples of different compositions were placed in a cassette, preheated and then dipped in a molten $KNO_3$ (>99%) bath at 420° C. for 220 minutes. After the ion exchange, the samples were cooled down and washed. Subsequently the surface compressive stress (CS) and the depth of exchanged layer (DoL) were measured via photoelasticimetry. The following table summarize the average value of CS and DoL for ten random samples of each of compositions 1-3 according to the invention and compositions of Comparative examples 1-2.

|  | Comparative ex. 1 (SL) | Comparative ex. 2 (AS) | Comparative ex. 3 (AS) | Ex1 | Ex2 | Ex3 |
|---|---|---|---|---|---|---|
| Surface compressive stress (Mpa) | 846 | 884 | 888 | 856 | 888 | 878 |
| Depth of exchanged layer (μm) | 7.1 | 36.1 | 11.4 | 17.7 | 17.0 | 17.7 |

Those results show that combining a rather low content in $Al_2O_3$ and CaO and a [MgO/(MgO+CaO)] ratio higher than 0.88 and lower than 1 gives low cost and easily producible compositions, allowing to significantly improve the depth of exchanged layer, while keeping a high surface compressive stress and thus, to increase the glass reinforcement.

Moreover, DOL values of compositions according to the invention are well appropriate for a "piece-by-piece" process used to produce cover glass for display devices (preferably higher than 10 microns and very preferably higher than 12 microns or even better higher than 15 microns).

Other Properties

The following properties were evaluated on the basis of glass composition using Fluegel model (*Glass Technol.: Europ. J. Glass Sci. Technol. A* 48 (1): 13-30 (2007); and *Journal of the American Ceramic Society* 90 (8): 2622 (2007))—for compositions of examples 1-4 according to the invention as well as of Comparative examples 1-2:
  Glass melt density evaluated at 1200 and 1400° C.;
  Viscosity through the "Melting point temperature T2";
  "Working point temperature T4";
  Devitrification temperature T0;
  Coefficient of thermal expansion (CET);
In a general manner:

The melting point temperature T2 is preferably at most 1550° C., more preferably at most 1520° C., the most preferably at most 1500° C.

The Working point temperature T4 is preferably at most 1130° C., more preferably at most 1100° C., the most preferably at most 1070° C.

The devitrification temperature T0 is preferably at most T4, more preferably at most T4-20° C., the most preferably at most T4-40° C.

CET value is preferably at most 9.6 and more preferably at most 9.5.

|  | Comp. ex. 1 (SL) | Comp. ex. 2 (AS) | Comp. ex. 3 (AS) | Ex 1 | Ex2 | Ex3 |
|---|---|---|---|---|---|---|
| Glass melt density (1200° C.) | 2.37 | 2.32 | 2.36 | 2.33 | 2.33 | 2.33 |
| Glass melt density (1400° C.) | 2.34 | 2.32 | 2.34 | 2.32 | 2.32 | 2.32 |
| Melting point T2 (° C.) | 1463 | 1602 | 1486 | 1489 | 1488 | 1493 |
| Working point T4 (° C.) | 1037 | 1124 | 1053 | 1054 | 1052 | 1055 |
| Devitrification temperature T0 (° C.) | 994 | 951 | 994 | 970 | 951 | 988 |
| CET @ 210° C. ($10^{-6}$/K) | 9.15 | 9.68 | 9.49 | 9.30 | 9.46 | 9.47 |

The compositions according to present invention are suitable for forming by a float process and while using existing furnace tools for production of soda lime glass because of:
  their melting point temperature T2 being lower than 1500° C. and which are comparable to a classical soda lime glass (Comparative ex. 1) and significantly lower compared to an aluminosilicate glass (Comparative ex. 2);
  their working point temperature T4 which is lower than 1100° C. and which are comparable to a classical soda lime glass (Comparative ex. 1) and lower compared to an aluminosilicate glass (Comparative ex. 2);
  their devitrification temperature T0 are suitable because lower than working point temperature T4;
  their glass density which is very close to soda lime and aluminosilicate glasses (Comparative ex. 1-2), thereby avoiding/limiting density defects during composition change (transition);

Moreover, the compositions according to present invention have coefficients of thermal expansion (CET) which reach in a known manner appropriate values for a subsequent chemical tempering (limiting differentiated cooling deformation phenomenon). More specifically, the compositions according to present invention show better (lower) values for CET than aluminosilicate glass and thus are less sensitive to differentiated cooling issues than AS glass.

Finally, compositions according to the invention allow to get sulfate fining ability during their manufacture/melting, thanks to an adequate solubility of sulfate and suitable high-temperature viscosity.

The invention claimed is:

1. A glass sheet having a boron and lithium-free glass composition comprising, in weight percentage, expressed with respect to a total weight of glass:

$65 \leq SiO_2 \leq 78\%$ $5 \leq Na_2O \leq 20\%$ $0 \leq K_2O \leq 3\%$ $3 < Al_2O_3 \leq 5\%$ 0.12<CaO<1.33% and 4≤MgO≤12%;

wherein: 0.90≤[MgO/MgO+CaO]<0.97.

2. The glass sheet according to claim 1, wherein the glass composition further comprises total iron, expressed in the form of $Fe_2O_3$, in a content ranging from 0.002 to 1.7% by weight.

3. The glass sheet according to claim 1, wherein the glass composition further comprises total iron, expressed in the form of $Fe_2O_3$, in a content ranging from 0.002 to 0.06% by weight.

4. The glass sheet according to claim 1, wherein the glass composition further comprises total iron, expressed in the form of $Fe_2O_3$, in a content ranging from 0.002 to 0.02% by weight.

5. The glass sheet according to claim 1, wherein $4≤Al_2O_3≤5$ wt %.

6. The glass sheet according to claim 1, wherein $4≤Al_2O_3≤4.5$ wt %.

7. The glass sheet according to claim 4, wherein $4.5≤Al_2O_3≤5$ wt %.

8. The glass sheet according to claim 1, wherein $0≤K_2O≤4$ wt %.

9. The glass sheet according to claim 1, wherein 0.92≤[MgO/(MgO+CaO)]≤0.97.

10. The glass sheet according to claim 1, wherein 0.90≤[MgO/(MgO+CaO)]≤0.96.

11. The glass sheet according to claim 1, which is chemically tempered.

12. The glass sheet according to claim 11, wherein the glass sheet has a Depth of exchanged layer of greater than 10 microns.

13. The glass sheet according to claim 11, wherein the glass sheet has a Depth of exchanged layer of greater than 15 microns.

14. The glass sheet according to claim 11, wherein the glass sheet has a surface compressive stress of from 856 to 888 MPa.

15. An electronic device comprising the glass sheet of claim 1.

16. A glass sheet having a boron and lithium-free glass composition comprising, in weight percentage, expressed with respect to a total weight of glass:

65≤$SiO_2$≤78%

5≤$Na_2O$≤20%

0≤$K_2O$<5%

3<$Al_2O_3$≤5%

0.21<CaO<1.33% and

4≤MgO≤12%;

wherein: 0.90≤[MgO/MgO+CaO]<0.95.

17. The glass sheet according to claim 16, wherein the glass composition further comprises total iron, expressed in the form of $Fe_2O_3$, in a content ranging from 0.002 to 0.06% by weight.

18. The glass sheet according to claim 16, wherein $4≤Al_2O_3≤5$ wt %.

19. A glass sheet having a boron and lithium-free glass composition comprising, in weight percentage, expressed with respect to a total weight of glass:

65≤$SiO_2$≤78%

5≤$Na_2O$≤20%

0≤$K_2O$<2%

4<$Al_2O_3$≤5%

0.19<CaO<1.11% and

6≤MgO≤10%;

wherein: 0.90≤[MgO/MgO+CaO]<0.97.

20. The glass sheet according to claim 9, wherein 0.90≤[MgO/(MgO+CaO)]≤0.95.

* * * * *